United States Patent [19]

Tolbert et al.

[11] Patent Number: 4,592,144
[45] Date of Patent: Jun. 3, 1986

[54] MOLDED SCROLLER SAW LOCK BUTTON SPRING

[75] Inventors: Richard R. Tolbert, Easley; Troy L. McCurry, West Union, both of S.C.

[73] Assignee: The Singer Company, Stamford, Conn.

[21] Appl. No.: 808,232

[22] Filed: Dec. 12, 1985

Related U.S. Application Data

[63] Continuation of Ser. No. 622,410, Jun. 22, 1984, abandoned, which is a continuation-in-part of Ser. No. 518,784, Jul. 29, 1983, abandoned.

[51] Int. Cl.⁴ .................................. B25F 5/02
[52] U.S. Cl. ................................. 30/394; 83/747; 200/157; 200/291
[58] Field of Search ........... 200/157, 325, 327, 291; 145/108 B; 83/747; 30/394, 392

[56] References Cited

U.S. PATENT DOCUMENTS

| | | | |
|---|---|---|---|
| 3,274,631 | 9/1966 | Spohr | 200/157 |
| 3,646,298 | 2/1972 | Weber et al. | 200/157 |
| 3,729,822 | 5/1973 | Batson | 30/394 |
| 3,847,233 | 11/1974 | Glover et al. | 173/170 |
| 3,854,020 | 12/1974 | Glover et al. | 200/321 |
| 3,867,591 | 2/1975 | Nordeen | 200/52 R |
| 3,873,796 | 3/1975 | Worobec, Jr. | 200/157 |
| 4,021,914 | 5/1977 | Leibundgut et al. | 30/392 |
| 4,023,001 | 5/1977 | Lafferty, Sr. | 200/157 |
| 4,054,766 | 10/1977 | Kramer | 200/157 |
| 4,075,442 | 2/1978 | Fukuda et al. | 200/291 X |
| 4,081,704 | 3/1978 | Vassos et al. | 310/50 |
| 4,082,925 | 4/1978 | Hufford | 200/291 X |
| 4,122,320 | 10/1978 | Edgell et al. | 200/157 |
| 4,131,771 | 12/1978 | Erickson et al. | 200/291 X |
| 4,190,754 | 2/1980 | Kilar | 200/329 |

*Primary Examiner*—Stephen Marcus
*Assistant Examiner*—Renee S. Luebke
*Attorney, Agent, or Firm*—Robert E. Smith; David L. Davis; Edward L. Bell

[57] ABSTRACT

For a powered hand tool having a plastic housing and requiring a slide button with a detent action for at least two positions with an audible indication of the transition from one position to another position, a plastic spring molded as part of the housing and having an arched surface extending into the path of a projection from the slide button which has first and second oppositely disposed tapered sides extending towards each other and terminating in a flat base portion which coacts with the arched surface to provide a detent action and an audible indication of the transition to a new position when the slide button impacts upon abutments formed as part of the housing.

3 Claims, 3 Drawing Figures

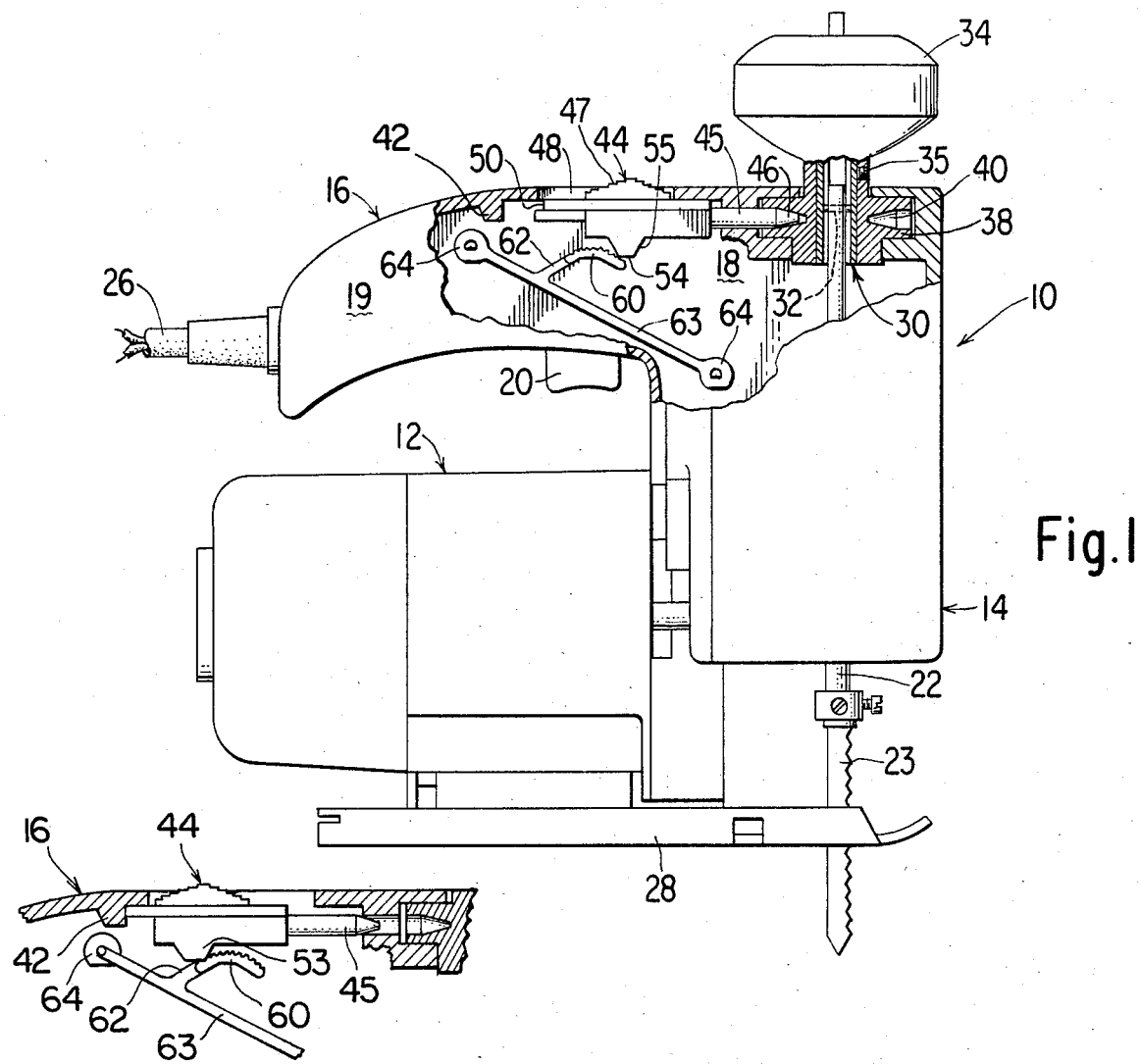
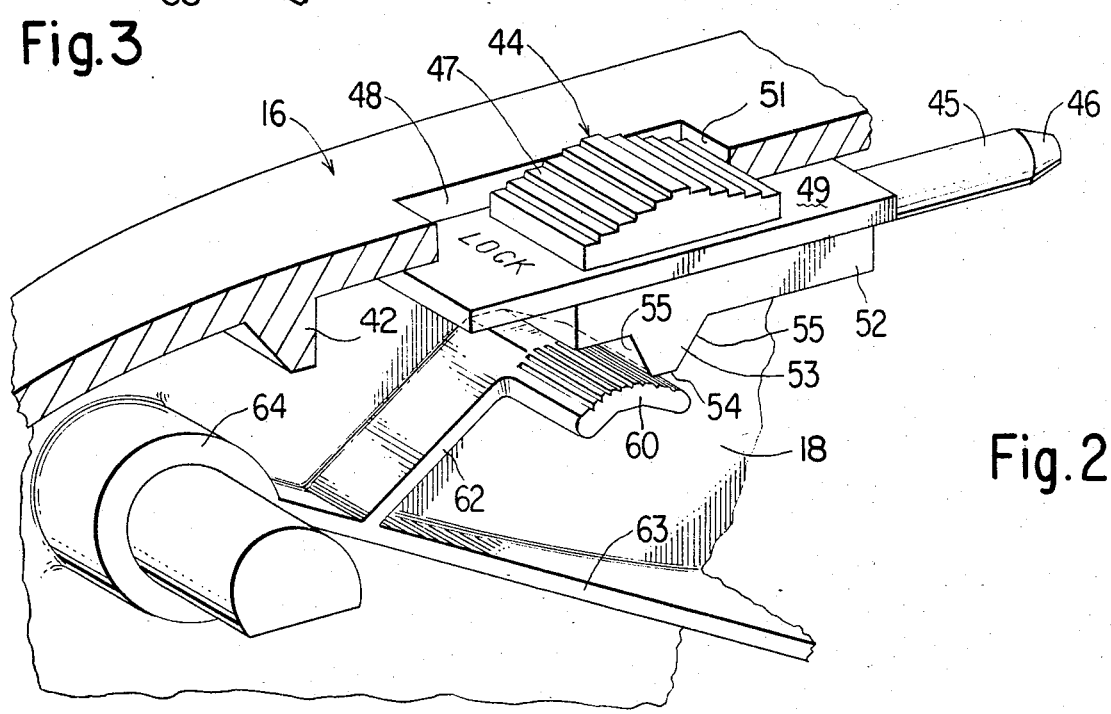
Fig.1
Fig.3
Fig.2

MOLDED SCROLLER SAW LOCK BUTTON SPRING

This is a continuation of Ser. No. 622,410, filed June 22, 1984, now abandoned which is a continuation-in-part of Ser. No. 518,784, filed July 29, 1983, also abandoned.

BACKGROUND OF THE INVENTION

This invention relates to a detent mechanism for a hand held powered tool; more particularly, to a detent spring molded as part of a plastic housing to provide detents and an audible indication when traversed in either direction by a slide button having a projection with tapered sides engaging the spring.

The prior art in detent mechanisms for hand held powered tools has provided for a separate spring and screw for retaining the same to a molded housing. Such a device is disclosed and described in U.S. Pat. No. 3,729,822, which relates to a sabre saw having a saw bar which is manually rotatable and selectively lockable about its own axis to set the cutting edge of the saw blade in different angularly oblique positions relative to the line of movement of the tool. A control knob is coupled to the saw bar by means which allow the saw bar to reciprocate within the control knob. Turning of the control knob will cause a like turning of the saw bar. A lock pin is transversely slidable with respect to the control knob and is carried by a slide button mounted in the handle of the housing. When the lock pin is in an unlocked position, the control knob can be manually manipulated. However, when the lock pin is in a locked position, a tapered tip thereof will lock the control knob by engagement with angled slots in an external flange of the bushing for the saw bar, so as to prevent turning of the control knob. In the prior art U.S. Pat. No. 3,729,822, the slide button is retained in the locked or unlocked position by a keeper implemented by a light leaf spring which cooperates with tapered sides of the slide button to define a particular position. This light leaf spring is retained to the tool housing by a screw. The difficulties with this arrangement are the cost of the screw and of the leaf spring, plus the cost of assembling the spring to the housing. Further, variability in manufacturing of the leaf spring frequently causes the detent to be excessive or insufficient at times, necessitating disassembly of the housing and reforming or replacing of the leaf spring until a proper detent is attained.

SUMMARY OF THE INVENTION

The above noted disadvantages are avoided in the arrangement in which a scroller lock button spring is molded as part of the housing for the sabre saw. The sabre saw housing is a clam shell design having a support half for the components of the sabre saw and a cover half substantially a mirror image of the support half. The plastic spring is molded, for example, with the cover half and extends with an arched upper and lower surface for increased regidity, from a web thereof contiguous the slide button which is slidably trapped between the support half and the cover half of the sabre saw. When the operator slides the slide button back and forth between the locked and unlocked position for the control knob, tapered sides and flat base portion on a projection thereof engage with the plastic spring, and the operator feels a noticeable detent when in the locked or unlocked position and is provided with an audible indication when traversing from one position to the other by the deflection and snap back of the plastic spring, accelerating the slide button into impact with parts of the housing. The arrangement thus provided avoids the variability in manufacture of the prior art leaf spring and in location of the same within the housing so as to provide for a uniformity of effort required to actuate the slide button due to the uniformity of location and stiffness of spring.

BRIEF DESCRIPTION OF THE DRAWINGS

The invention is illustrated in the accompanying drawings in which:

FIG. 1 is a longitudinal elevational view, partly in section, of a sabre saw illustrating a preferred embodiment of the present invention;

FIG. 2 is an enlarged perspective view of the scroller slide lock arrangement; and FIG. 3 is a longitudinal elevational view of the slide button in another operative position.

DETAILED DESCRIPTION OF THE INVENTION

With reference now to the drawings, particularly to FIG. 1 thereof, there is shown and illustrated therein a sabre saw designated generally by the reference character 10. While a sabre saw 10 is illustrated, it is to be understood that the invention to be explained below might be included in any power hand tool having a switch in which discrete positions and audible indication of traverse from one position to another is required.

The sabre saw 10 comprises a motor housing portion 12, a front or drive housing portion 14, and a handle portion 16 of clam shell construction in which, as is known in the art, the components of the sabre saw are mounted in a support half which is closed off by a cover half that is substantially a mirror image of the support half. A portion of the sabre saw 10 has been broken away to expose the cover half 18 of the handle portion 16 construction to which the invention has been added. A trigger switch 20 is shown extending from the handle portion 16, depression of which serves to initiate endwise reciprocation of a saw bar 22 and saw blade 23 attached thereto, in a manner well known in the art. An electric cord 26 extends from the handle portion 16 to a source of power to enable operation of the sabre saw 10. The saw blade 23 extends through a work contacting shoe 28 to operate upon the work positioned thereberneath.

The saw bar 22 extends upwardly through the drive housing portion 14, in a manner which allows it to be selectively endwise reciprocated by action of the trigger switch 20, while it is free to turn about it's axis within the drive housing portion 14. Such a teaching is contained in the U.S. Pat. No. 3,729,822 issued on May 1, 1973, to Batson, and assigned to the assignee of this invention, which is hereby incorporated by reference. A saw bar 22 reciprocates within a bearing (not shown) in the bottom of the drive housing portion 14, and a journal bushing 30 captured in the top of the drive housing portion and fully explained in the above referenced patent to which the reader is referred. It is sufficient to note that the saw bar is formed with a pin 32 extending therethrough at the top thereof, the ends of the pin extending into diametral slots in the internal diameter of journal bushing 30. Thus, rotation of the journal bushing 30 will implement rotation of the saw bar while allowing endwise reciprocation thereof. A control knob 34 is attached to the journal bushing 30 by set screw 35. The journal bushing 30 is further formed with a flange 38 having four tapered slots 40 extending radially inwardly from the periphery thereof, only two of which are shown. The tapered slots 40 of the flange 38 of the journal bushing 30 are used to locate the saw bar 22 in the four discrete angular positions. In order to effectively utilize the sabre saw 10 with the saw bar 22 and saw blade 23 attached thereto in an angular position provided for, a means must be provided for locking the control knob 34 and the saw bar 22 in the selected angular position. As disclosed in the above referenced U.S. Pat. No. 3,729,822, this is accomplished by providing a slide button 44 having a lock pin 45 extending therefrom, the lock pin having a tapered front surface 46 to be received in the tapered apertures 40 of the flange 38 of the journal bushing 30. The slide button 44 is slidably mounted within the handle portion 16 adjacent the upper surface thereof, so that a button portion 47 having a stepped upper surface which inclines downwardly in either direction from the high point in the center thereof, projects through an aperture 48 formed in the upper surface of the handle for ease and convenience of operator actuation thereof. The slide button 44 further includes a central fin 49 on which the button portion 47 sits, which fin projects sidewardly into slots 50 formed in the handle portion 16 to support the slide button 44. Below the central fin 49, the slide button 44 is fashioned with a protuberance 52 which supports the lock pin 45 and a downwardly extending projection 53 with tapered sides 55 which extend towards each other to terminate in a flat base portion 54. Preferably, the slide button 44 is molded with the lock pin 45 as an insert thereto.

Referring to FIGS. 1 and 2, there is molded as part of the handle portion 16, a plastic spring 60 formed as part of and extending cantilevered from the cover half 18 laterally beneath the projection 53 of slide button 44, although it might have also been formed as part of the support half 19. The plastic spring 60 is formed with an arched upper and lower surface to increase rigidity and spring constant, and to provide a surface to coact with the tapered sides 55 and flat base portion 54 on the slide button 44 beneath which it extends. The plastic spring derives additional support from support rib 62 connected to support rib 63 extending between posts 64. The plastic spring 60 is arranged to have the arched upper surface thereof coact with the flat base portion 54 and the juncture therewith of the tapered sides 55 of slide button 44 during withdrawal or engagement of the tapered front portion 46 of the lock pin 45 with the tapered aperture 40 in the journal bushing 30 as shown in each of the figures as the drawing. As the flat base portion 54 of the slide button 44 is drawn over the cantilevered portion of the arched surface 60, a detent action is felt indicating the transition from a first to a second position, or vice versa, of the button. An audible indication of the transition is provided by impact of the button with abutment means associated with the handle 16 in response to acceleration of the button influenced by the changing angle of contact of the cantilevered arched surface of the serving 60 with the slide button 44 as the slide button approaches contact with the abutment means to accelerate same into audible contact with the front wall 51 of aperture 48 on locking motion of the slide button, or with post 42 of the cover half 18 on unlocking motion of the slide button releasing the control knob for rotation, where the front wall and the post operate as abutments for the slide button (see FIGS. 1 and 3). In order to obtain an appropriate detent, that is, one that is tactile or evident to the touch, and also an appropriate audible indication, the spring constant of the plastic spring 60 may be adjusted by changing the thickness between the arched upper and lower surface, as well as by modifying where possible the length of the plastic spring between the point of contact of the slide button 44 and the point where the spring merges into the housing. By merging the plastic spring 60 with the rib 62 of the cover half 18, additional rigidity for the plastic spring is provided without requiring a buildup of material on the cover half to obtain a shorter plastic spring. Thus, a selected length for the plastic spring is established by the depth of the support rib.

As indicated by the above description, a new and improved detent mechanism has been provided which also provides an audible indication of actuation. This invention has allowed the elimination of parts and obviated the occasional necessity for disassembly and realigning of a metal lock button spring.

The invention was described with respect to a preferred embodiment. Various changes may be made without departing from the spirit and scope of the invention.

We claim:

1. For a powered hand tool having a plastic housing for holding operating components thereof, and a plastic cover for enclosing said components in said housing, said hand tool having a slide button guided for linear movement relatively to said housing and cover, a detent arrangement providing tactile and audible indication of actuation of said slide button, said detent arrangement comprising:

an inwardly extending projection on said slide button, said projection being formed with first and second oppositely disposed taper sides extending toward each other and each terminating in a juncture with a flat base portion, and a plastic spring extending cantilevered lateraly adjacent said projection from a selected one of said cover and said housing and molded as a part thereof, a selected one of said housing and said cover including abutment means defining for said slide button first and second opposite extreme positions of linear movement, said plastic spring having a first arched surface extending beneath said slide button projection in all positions of said slide button between said first and second extreme positions, said plastic spring first arched surface being contiguous with only the juncture of said flat base portion and said first tapered side of said slide button projection in the first extreme position of said slide button, and contiguous with only the juncture of said flat base portion and said second tapered side of said slide button projection in the second extreme position of said slide button, whereby shifting said slide button from any one to the other of said first and second positions will cause deflection and snap back of said plastic spring to provide a detent for said slide button and acceleration of said slide button induced by changing angle of contact of said arched spring surface with the juncture of said flat base portion with said tapered sides to produce an audible indication of the attainment of the selected position upon impact of said slide button with said abutment associated with said selected position.

2. A detent arrangement as claimed in claim 1 wherein said plastic spring further comprises a second arched surface spaced from said first arched surface and providing for a material thickness therebetween of said plastic spring which taken with a length thereof establishes a spring constant therefor which provides detent and acceleration to produce the audible indication of attainment of selected positions.

3. A detent arrangement as claimed in claim 2 wherein said selected one of said cover and said housing is formed with a support rib, said plastic spring extending from said support rib in a selected length established by the depth of said support rib.

* * * * *